United States Patent
Song et al.

(10) Patent No.: US 9,547,180 B2
(45) Date of Patent: Jan. 17, 2017

(54) LIQUID CRYSTAL LENS DEVICE AND DISPLAY DEVICE HAVING THE SAME

(71) Applicant: SAMSUNG DISPLAY CO., LTD., Yongin, Gyeonggi-Do (KR)

(72) Inventors: Jin Oh Song, Seoul (KR); Kyung Ho Jung, Seongnam-Si (KR); Hae Young Yun, Suwon-Si (KR); Jung Hwan Yi, Yongin-Si (KR); Myung Chul Jung, Suwon-Si (KR); Chun Ki Choi, Yongin (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 154 days.

(21) Appl. No.: 14/516,003

(22) Filed: Oct. 16, 2014

(65) Prior Publication Data

US 2015/0346560 A1 Dec. 3, 2015

(30) Foreign Application Priority Data

Jun. 3, 2014 (KR) .................. 10-2014-0067639

(51) Int. Cl.
G02B 27/22 (2006.01)
G02F 1/1345 (2006.01)

(52) U.S. Cl.
CPC ......... *G02B 27/2228* (2013.01); *G02F 1/1345* (2013.01)

(58) Field of Classification Search
CPC .............. G02B 27/2228; G02F 1/1345; G02F 1/134309; H04N 13/0452
USPC .............................. 348/51, 200, 15, E13.075
See application file for complete search history.

(56) References Cited

U.S. PATENT DOCUMENTS

| | | | |
|---|---|---|---|
| 9,013,647 B2* | 4/2015 | Takahashi | G02B 27/2214 349/15 |
| 9,420,267 B2* | 8/2016 | Jung | H04N 13/0404 |
| 2011/0228181 A1 | 9/2011 | Jeong et al. | |
| 2012/0162550 A1 | 6/2012 | Jeong et al. | |
| 2012/0300042 A1 | 11/2012 | Yun et al. | |
| 2013/0107174 A1 | 5/2013 | Yun et al. | |
| 2015/0077666 A1* | 3/2015 | Song | G02B 27/2214 349/15 |
| 2015/0160508 A1 | 6/2015 | Kim et al. | |
| 2015/0363016 A1* | 12/2015 | Furutani | G09G 3/36 345/173 |

FOREIGN PATENT DOCUMENTS

| KR | 1020100075301 | 7/2010 |
|---|---|---|
| KR | 1020100075302 | 7/2010 |
| KR | 1020120130397 | 12/2012 |

* cited by examiner

*Primary Examiner* — Huyen Ngo

(74) *Attorney, Agent, or Firm* — F. Chau & Associates, LLC

(57) ABSTRACT

A liquid crystal lens device includes a first substrate including a display area, a first non-display area, and a second non-display area with the display area interposed between the first and second non-display areas. First bus lines are disposed over the first non-display area. Second bus lines are disposed over the second non-display area and are insulated from the first bus lines. First electrode groups are disposed over the display area and the first non-display area and are connected to the first bus lines. Second electrode groups are disposed over the display area and the second non-display area and are connected to the second bus lines.

21 Claims, 11 Drawing Sheets

LIQUID CRYSTAL LENS DEVICE AND DISPLAY DEVICE HAVING THE SAME

This application claims priority to Korean Patent Application No. 10-2014-0067639 filed on Jun. 3, 2014 in the Korean Intellectual Property Office, the disclosure of which is herein incorporated by reference in its entirety.

BACKGROUND

Technical Field

The present invention relates to a display device, and more particularly, to a liquid crystal lens device and a display device having the same.

Discussion of the Related Art

A variety of display devices capable of displaying information are presently available. Examples of display devices include a liquid crystal display ("LCD"), an organic light-emitting display, a plasma display panel ("PDP"), and a field emission display ("FED").

Some display devices are able to display a three-dimensional (3D) image using special equipment. For example, a lens device may be used to help a display device display a 3D image by directing a left-eye image to a viewer's left eye while directing a right-eye image to a user's right eye.

A liquid crystal lens device may include a lower substrate, a plurality of lens electrodes disposed on the lower substrate, a liquid crystal layer disposed above the lens electrodes, a common electrode disposed above the liquid crystal layer, and an upper substrate disposed above the common electrode.

Contacts for the lens electrodes and a plurality of bus lines, which transmit a voltage to the lens electrodes, are provided in a peripheral region on the lower substrate.

In general, since a large-size display device not only has a large peripheral region, but also has wide lens electrodes, it might not be difficult to provide contacts for the lens electrodes and bus lines in the peripheral region.

On the other hand, since a small-size display device generally has a narrow peripheral region and narrow lens electrodes, it may be difficult to properly form contacts for the lens electrodes and bus lines in the peripheral region.

SUMMARY

Exemplary embodiments of the invention provide a liquid crystal lens device capable of securing sufficiently large contact areas for lens electrodes and bus lines.

Exemplary embodiments of the invention also provide a display device having a liquid crystal lens device configured to secure sufficiently large contact areas for lens electrodes and a bus lines.

According to an exemplary embodiment of the invention, a liquid crystal lens device includes a first substrate including a display area, a first non-display area, and a second non-display area. The second non-display area faces the first non-display area with the display area interposed therebetween. First bus lines are disposed over the first non-display area. Second bus lines are disposed over the second non-display area and are insulated from the first bus lines. First electrode groups are disposed over the display area and the first non-display area and are connected to the first bus lines. Second electrode groups are disposed over the display area and the second non-display area and are connected to the second bus lines.

The second bus lines may extend throughout the second non-display area to the first non-display area.

One of the first bus lines may be located between a pair of adjacent second bus lines in the first non-display area.

The liquid crystal lens device may further include a lens driver disposed in the first non-display area, near the first bus lines and the second bus lines.

The first bus lines and the second bus lines may also be disposed between the lens driver and the display area.

The liquid crystal lens device may further include connecting lines connecting the lens driver to one of the first bus lines or one of the second bus lines. Each of the connecting lines may be located between a pair of adjacent first electrode groups in the first non-display area.

Each of the first electrode groups may include first sub-electrodes and each of the connecting lines is formed in one body with one of the first sub-electrodes of each of the first electrode groups.

One of the first electrode groups may be located between a pair of adjacent second electrode groups.

The first electrode groups and the second electrode groups may extend diagonally with respect to sides of the first substrate.

Each of the first electrode groups may first sub-electrodes, the first sub-electrodes including two or more first lower electrodes and two or more first upper electrodes disposed above, and insulated from, the first lower electrodes. Each of the second electrode groups may include second sub-electrodes. The first sub-electrodes may include two or more second lower electrodes and two or more second upper electrodes disposed above, and insulated from, the second lower electrodes.

One of the first sub-electrodes may be located between a pair of adjacent first upper electrodes and one of the second sub-electrodes may be located between a pair of adjacent second upper electrodes.

A first electrode group, among other first electrode groups, and a second electrode group, among other second electrode groups, adjacent to the first electrode group may form a unit lens. In the unit lens, one of the first sub-electrodes of the first electrode group that is adjacent to the second electrode group is disposed on a different level from one of the second sub-electrodes of the second electrode group that is adjacent to the first electrode group.

A first electrode group, among other first electrode groups, and a second electrode group, among other second electrode groups, adjacent to the first electrode group may form a unit lens. In the unit lens, one of the first sub-electrodes of the first electrode group that is adjacent to the second electrode group has substantially the same width as one of the second sub-electrodes of the second electrode group that is adjacent to the first electrode group.

A first electrode group, among other first electrode groups, and a second electrode group, among other second electrode groups, adjacent to the first electrode group may form a unit lens. In the unit lens, one of the first sub-electrodes of the first electrode group that is adjacent to the second electrode group has a different width from one of the second sub-electrodes of the second electrode group that is adjacent to the first electrode group.

The liquid crystal lens device may further include a second substrate facing the first substrate, and a liquid crystal layer interposed between the first substrate and the second substrate.

According to an exemplary embodiment of the invention, a liquid crystal lens device includes a substrate including a display area and a first non-display area disposed on a first side of the display area. First bus lines and second bus lines are disposed over the first non-display area. The second bus lines are insulated from the first bus lines. First electrode groups are disposed over the display area and the first non-display area and are connected to the first bus lines. The first bus lines and the second bus lines are alternately arranged over the first non-display area.

The substrate may further include a second non-display may be disposed on a second side of the display area opposite to the first side of the display area. The second bus lines may extend throughout the first non-display area to the second non-display area.

The liquid crystal lens device may further include second electrode groups disposed over the display area and the second non-display area and the second electrode groups may be connected to the second bus lines.

The first electrode groups and the second electrode groups may be alternately arranged.

According to an exemplary embodiment of the invention, a display device includes a display panel configured to display a two-dimensional ("2D") or three-dimensional ("3D") image. A liquid crystal lens device is disposed above the display panel. The liquid crystal lens device includes a first substrate including a display area, a first non-display area, and a second non-display area. The first non-display area and the second non-display area face each other with the display area interposed therebetween. First bus lines are disposed over the first non-display area. Second bus lines are disposed over the second non-display area and are insulated from the first bus lines. First electrode groups are disposed over the display area and the first non-display area and are connected to the first bus lines. Second electrode groups are disposed over the display area and the second non-display area and are connected to the second bus lines.

Accordingly, contact areas for a plurality of lens electrodes and a plurality of bus lines may be sufficiently large.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
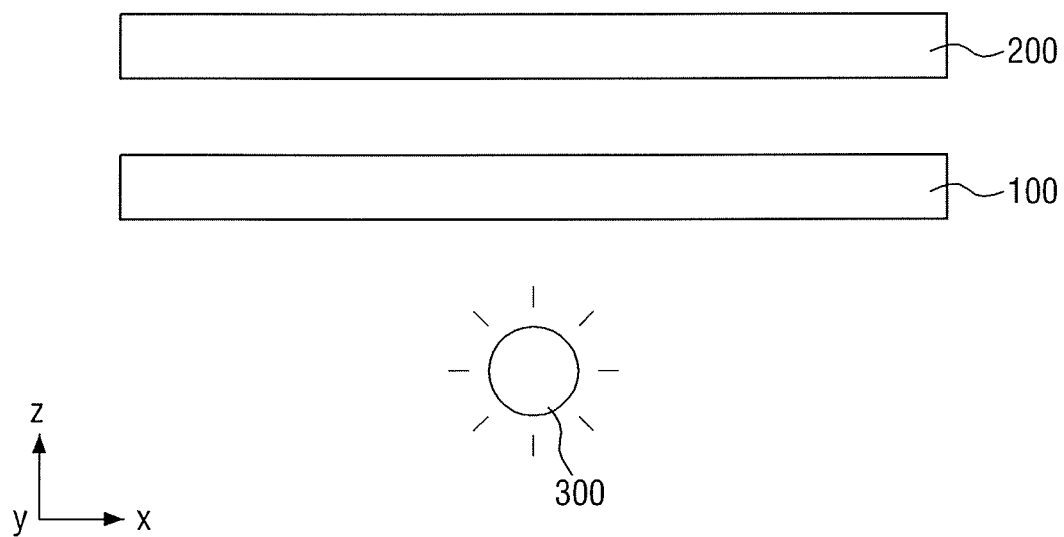
FIG. 1 is an exploded side view of a display device according to an exemplary embodiment of the invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. The term "on" may be used herein to designate that an element is located directly on another element or a layer or to designate that an element is located on another element with other elements or layers intervening. In the description of the present invention, the same drawing reference numerals may be used to indicate the same or similar elements across various figures.

Although the terms "first, second, and so forth" are used to describe different constituent elements, such constituent elements are not limited by the terms. The terms are used only to discriminate a constituent element from other constituent elements. Exemplary embodiments of the invention will hereinafter be described with reference to the accompanying drawings.

FIG. 1 is an exploded side view of a display device according to an exemplary embodiment of the invention. Referring to FIG. 1, the display device may include a display panel 100, a liquid crystal lens device 200, and a light source 300.

The display panel 100, which is a panel for displaying an image, may be a liquid crystal display ("LCD") panel, an electrophoretic display panel, an organic light-emitting diode ("OLED") panel, a light-emitting diode ("LED") panel, an inorganic electroluminescent ("EL") display panel, a field-emission display ("FED") panel, a surface-conduction electron-emitter display ("SED") panel, a plasma display panel ("PDP"), or a cathode ray tube ("CRT") display panel. In the description that follows, it is assumed that the display panel 100 is an LCD panel, but the invention is not limited thereto. For example, various display panels, other than an LCD panel, may be used as the display panel 100.

The liquid crystal lens device 200 may be disposed above the display panel 100. In response to the display panel 100 being provided with a two-dimensional ("2D") image and being driven in a 2D mode, the liquid crystal lens device 200 may be deactivated such that it does not operate as a Fresnel lens. On the other hand, in response to the display panel 100 being provided with a three-dimensional ("3D") image and being driven in a 3D mode, the liquid crystal lens device 200 may be activated and may operate as a Fresnel lens.

The light source 300 may be disposed below the display panel 100. The light source 300 may provide light to the display panel 100. In an exemplary embodiment, the light source 300 may be an LED, but the invention is not limited thereto. The light source 300 may be used in a case in which the display panel 100 is a passive light-emitting device. However, in embodiments in which the display panel 100 is an active light-emitting device such as an organic LED panel, the light source 300 may be omitted.

Figure 2:
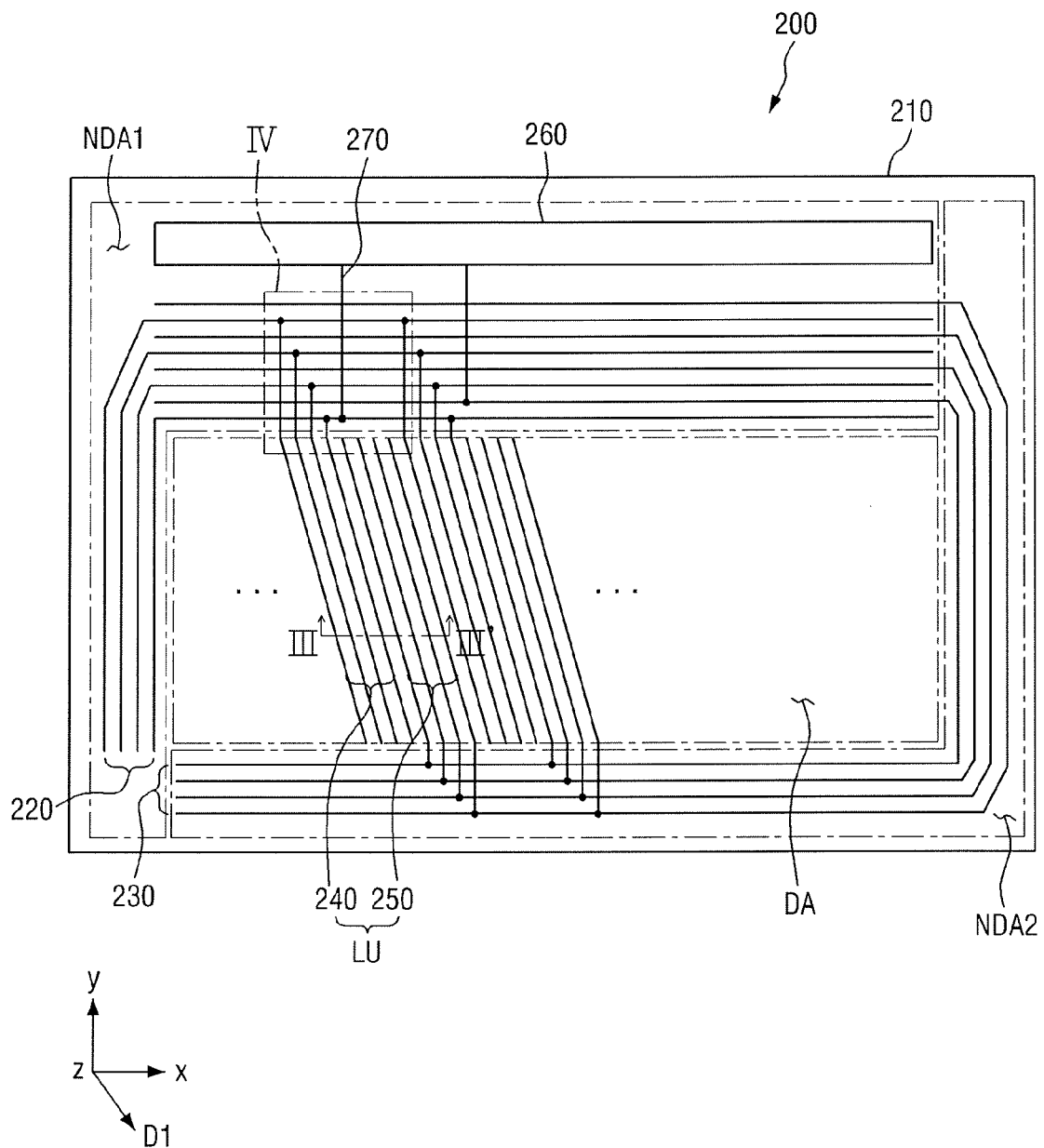
FIG. 2 is a plan view of a liquid crystal lens device illustrated in FIG. 1.

The liquid crystal lens device 200 will hereinafter be described in further detail with reference to FIGS. 2 and 3. FIG. 2 is a plan view of the liquid crystal lens device 200, and FIG. 3 is a cross-sectional view taken along line III-III' of FIG. 2.

Figure 3:
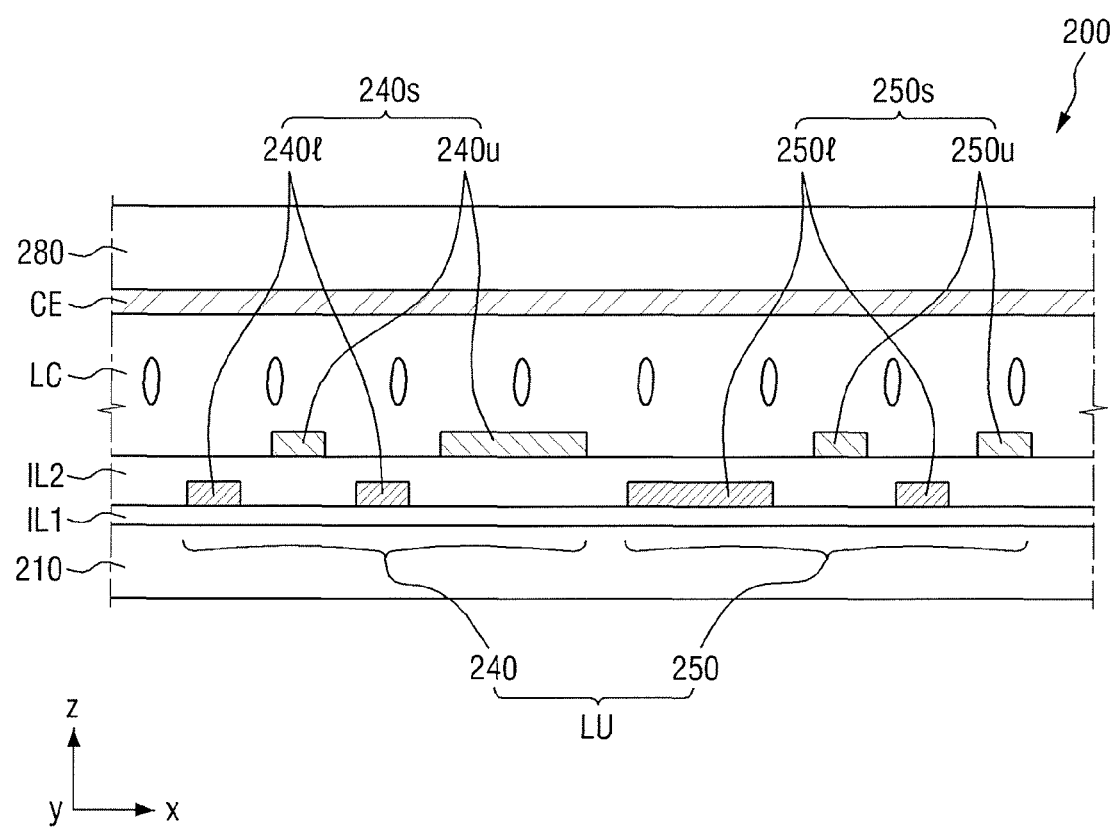
FIG. 3 is a cross-sectional view taken along line of FIG. 2.

Referring to FIGS. 2 and 3, the liquid crystal lens device 200 may include a first substrate 210, a plurality of first bus lines 220, a plurality of second bus lines 230, a first insulating layer IL1, a second insulating layer IL2, a plurality of first electrode groups 240, a plurality of second electrode groups 250, a lens driver 260, connecting lines 270, a second substrate 280, a common electrode CE, and a liquid crystal layer LC.

The first substrate 210 may include an insulating substrate. The insulating substrate may be formed of a transparent glass material having SiO$_2$, which is transparent, as a main ingredient thereof. In an exemplary embodiment, the insulating substrate may be formed of a plastic material. The insulating substrate may be a flexible substrate that is bendable, foldable, and/or rollable.

The first substrate 210 may include a display area DA, a first non-display area NDA1 and a second non-display area NDA2.

The display area DA may be disposed at the center of the first substrate 210. The display area DA may be a region where images are displayed. For example, the display area DA may be a region that transmits light provided by the display panel 100 therethrough.

The first non-display area NDA1 may be disposed on a first side of the display area DA. In an exemplary embodiment, the first non-display area NDA1 may be provided at the top and on the left side of the display area DA. The first non-display area NDA1 may be a region where no images are displayed. For example, the first non-display area NDA1 may be a region that does not transmit light provided by the display panel 100 therethrough.

The second non-display area NDA2 may be disposed on a second side of the display area DA, which is opposite to the first side of the display area DA. In an exemplary embodiment, the second non-display area NDA2 may be provided at the bottom and on the right side of the display area DA. For example, the first non-display area NDA1 and the second non-display area NDA2 may face each other with the display area DA interposed therebetween. The second non-display area NDA2, like the first non-display area NDA1, may be a region where no images are displayed. For example, the second non-display area NDA2, like the first non-display area NDA1, may be a region that does not transmit light provided by the display panel 100 therethrough.

The first bus lines 220 may be provided in the first non-display area NDA1 of the first substrate 210. In an exemplary embodiment, four first bus lines 220 may be provided, as illustrated in FIG. 2, but the invention is not limited thereto. For example, more or less than four first bus lines 220 may be provided.

The first bus lines 220 may be arranged in parallel to one another. The first bus lines 220 may include at least one bend. In an exemplary embodiment, the first bus lines 220 may extend in an x-axis direction in a part of the first non-display area NDA1 at the top of the display area DA, and may extend in a y-axis direction in a part of the first non-display area NDA1 on the right side of the display area DA.

The first bus lines 220 may be formed of a conductive material. In an exemplary embodiment, the first bus lines 220 may include a metal such as copper (Cu), aluminum (Al), or a combination thereof, but the invention is not limited thereto.

The second bus lines 230 may be provided in the second non-display area NDA2 of the first substrate 210. The second bus lines 230 may be electrically insulated from the first bus lines 220. In an exemplary embodiment, four second bus lines 230 may be provided, as illustrated in FIG. 2, but the invention is not limited thereto. For example, more or less than four second bus lines 230 may be provided.

The second bus lines 230 may be arranged in parallel to one another. The s second bus lines 230 may include at least one bend. In an exemplary embodiment, the second bus lines 230 may extend in the x-axis direction in the part of the second non-display area NDA2 at the bottom of the display area DA, and may extend in the y-axis direction in the part of the second non-display area NDA2 on the left side of the display area DA.

The second bus lines 230 may be formed of a conductive material. In an exemplary embodiment, the second bus lines 230 may be formed of substantially the same material as the first bus lines 220. For example, the second bus lines 230 may include a metal such as copper (Cu), aluminum (Al), or a combination thereof, but the invention is not limited thereto.

The second bus lines 230 may extend throughout the second non-display area NDA2 to the first non-display area NDA1. In an exemplary embodiment, the second bus lines 230 may extend from part of the second non-display area NDA2 on the right side of the display area DA to part of the first non-display area NDA1 on the right side of the display area DA. One of the first bus lines 220 in the part of the first non-display area NDA1 at the top of the display area DA may be located between a pair of adjacent second bus lines 230. For example, the first bus lines 220 and the second bus lines 230 may be alternately arranged over the part of the first non-display are NDA1 at the top of the display area DA. In an exemplary embodiment, the first bus lines 220 and the second bus lines 230 may be alternately arranged over the part of the first non-display are NDA1 at the top of the display area DA, starting with a first bus line 220 directly at the top of the display area DA, but the invention is not limited thereto.

The first insulating layer IL1 and the second insulating layer IL2 may be sequentially deposited above the first bus lines 220 and the second bus lines 230. The first insulating layer IL1 and the second insulating layer IL2 may include an insulating material such as SiOx, SiNx or a combination thereof.

The first electrode groups 240 may be disposed over the display area DA and the first non-display area NDA1, but not in the second non-display area NDA2. The first electrode groups 240 may be electrically connected to the first bus lines 220 in the part of the first non-display area NDA1 at the top of the display area DA.

The electrodes of the first electrode groups 240 may be arranged side-by-side in parallel to one another. The electrodes of the first electrode groups 240 may be isolated from one another.

The first electrode groups 240 may extend diagonally with respect to the sides of the first substrate 210. In an exemplary embodiment, the first electrode groups 240 may extend in a direction D1, as illustrated in FIG. 2.

Each of the first electrode groups 240 may include a plurality of first sub-electrodes 240s. The number of first sub-electrodes 240s included in each of the first electrode groups 240 may be the same as the number of first bus lines 220. For example, each of the first electrode groups 240 may include four first sub-electrodes 240s, as illustrated in FIG. 2, but the invention is not limited thereto. The number of first sub-electrodes 240s included in each of the first electrode groups 240 may vary depending on the number of first bus lines 220.

The first sub-electrodes 240s of each of the first electrode groups 240 may be electrically connected to the first bus lines 220, respectively, in the part of the first non-display area NDA1 at the top of the display area DA.

The first sub-electrodes 240s of each of the first electrode groups 240 may be arranged in parallel to one another, and may include at least one bend. In an exemplary embodiment, the first sub-electrodes 240s of each of the first electrode groups 240 may extend in the direction D1 in the display area DA, and may extend in the y-axis direction in the part of the first non-display area NDA1 at the top of the display area DA.

The first sub-electrodes 240s of each of the first electrode groups 240 may be formed of a transparent conductive oxide material. In an exemplary embodiment, the first sub-electrodes 240s of each of the first electrode groups 240 may include indium tin oxide ("ITO"), indium zinc oxide ("IZO"), or a combination thereof, but the invention is not limited thereto.

The first sub-electrodes 240s of each of the first electrode groups 240 may include two or more first lower electrodes 240l and two or more first upper electrodes 240u, which are disposed above the first lower electrodes 240l and are insulated from the first lower electrodes 240l. The first lower electrodes 240l may be disposed between the first insulating layer IL1 and the second insulating layer IL2, and the first upper electrodes 240u may be disposed on the second insulating layer IL2. In an exemplary embodiment, one of the first lower electrodes 240l may be located between a pair of adjacent first upper electrodes 240u. For example, the first lower electrodes 240l and the first upper electrodes 240u may be alternately arranged.

The second electrode groups 250 may be disposed over the display area DA and the second non-display area NDA2, but not over the first non-display area NDA1. The second electrode groups 250 may be electrically connected to the second bus lines 230 in the part of the second non-display area NDA2 at the bottom of the display area DA.

The second electrode groups 250 may be arranged side-by-side in parallel to one another. In an exemplary embodiment, the second electrode groups 250 may extend in parallel to the first electrode groups 240. The second electrode groups 250 may be isolated from one another. In an exemplary embodiment, one of the first electrode groups 240 may be located between a pair of adjacent second electrode groups 250. For example, the first electrode groups 240 and the second electrode groups 250 may be alternately arranged.

The second electrode groups 250 may extend diagonally with respect to the sides of the first substrate 210. In an exemplary embodiment, the second electrode groups 250 may extend in the direction D1, as illustrated in FIG. 2.

Each of the second electrode groups 250 may include a plurality of second sub-electrodes 250s. The number of second sub-electrodes 250s included in each of the second electrode groups 250 may be the same as the number of second bus lines 230. For example, each of the second electrode groups 250 may include four second sub-electrodes 250s, as illustrated in FIG. 2, but the invention is not limited thereto. The number of second sub-electrodes 250s included in each of the second electrode groups 250 may vary depending on the number of second bus lines 230.

The second sub-electrodes 250s of each of the second electrode groups 250 may be electrically connected to the second bus lines 230, respectively, in the part of the second non-display area NDA2 at the bottom of the display area DA.

The second sub-electrodes 250s of each of the second electrode groups 250 may be arranged in parallel to one another, and may include at least one bend. In an exemplary embodiment, the second sub-electrodes 250s of each of the second electrode groups 250 may extend in the direction D1 in the display area DA, and may extend in the y-axis direction in the part of the second non-display area NDA2 at the bottom of the display area DA.

The second sub-electrodes 250s of each of the second electrode groups 250 may be formed of a transparent conductive oxide material. In an exemplary embodiment, the second sub-electrodes 250s of each of the second electrode groups 250 may be formed of substantially the same material as the first sub-electrodes 240s of each of the first electrode groups 240. For example, the second sub-electrodes 250s of each of the second electrode groups 250 may include ITO, IZO, or a combination thereof, but the invention is not limited thereto.

The second sub-electrodes 250s of each of the second electrode groups 250 may include two or more second lower electrodes 250l and two or more second upper electrodes 250u, which are disposed above the second lower electrodes 250l and are insulated from the second lower electrodes 250l. The second lower electrodes 250l may be disposed between the first insulating layer IL1 and the second insulating layer IL2, and the second upper electrodes 250u may be disposed on the second insulating layer IL2. In an exemplary embodiment, one of the second lower electrodes 250l may be located between a pair of adjacent second upper electrodes 250u. For example, the second lower electrodes 250l and the second upper electrodes 250u may be alternately arranged.

As illustrated in FIG. 3, a first electrode group 240 and a second electrode group 250 adjacent to the first electrode group 240 may form a unit lens LU. The term "unit lens", as used herein, may indicate part of the liquid crystal lens device 200 that operates as a single lens that may be independently driven. In an exemplary embodiment, two or more unit lenses LU may be provided, being arranged in one direction, for example, the x-axis direction.

Figure 4:
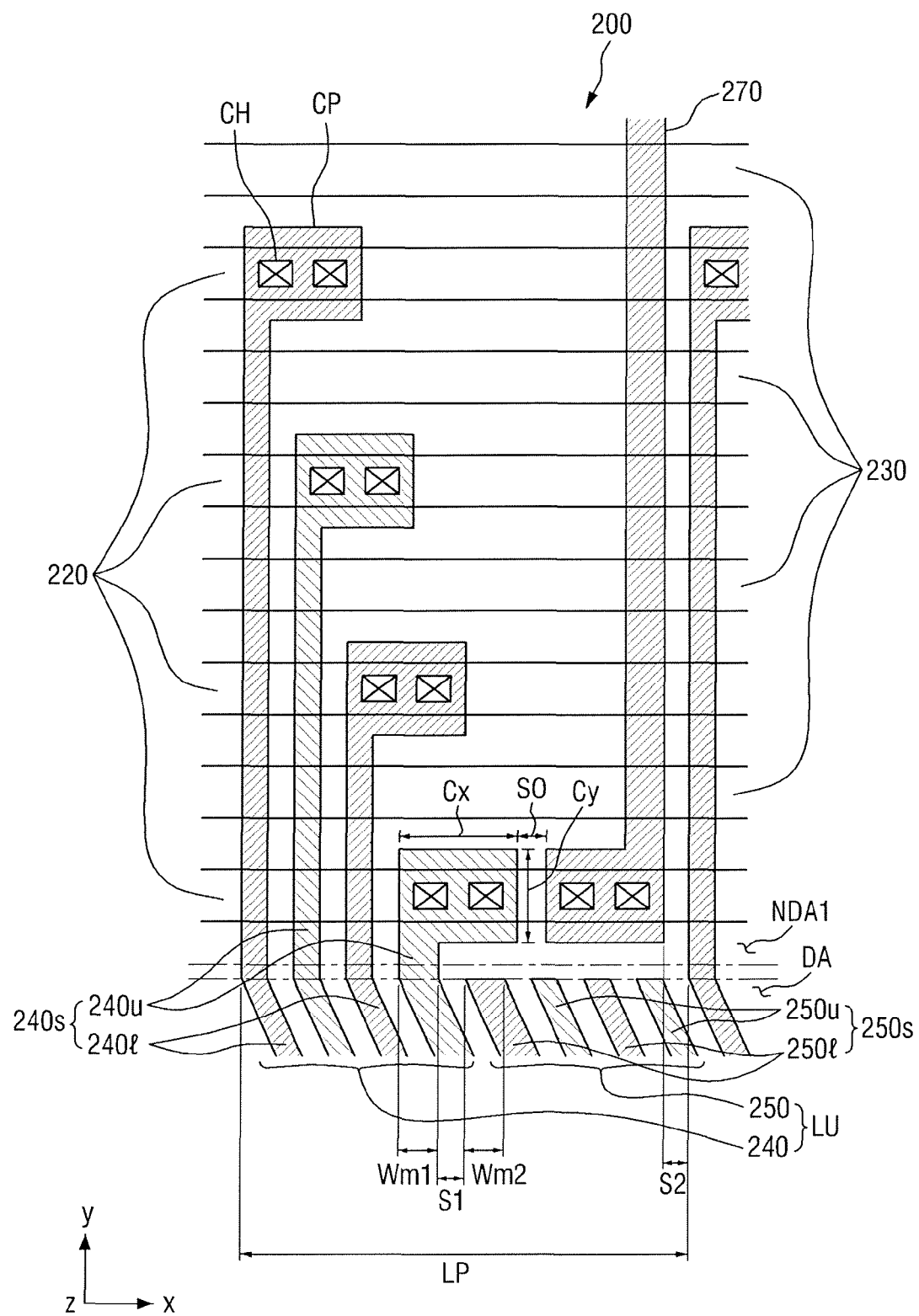
FIG. 4 is an enlarged plan view of portion IV of FIG. 2.

In the unit lens LU, one of a plurality of first sub-electrodes 240s may be located on a different level from one of a plurality of second sub-electrodes 250s. For example, a first sub-electrode 240s that is adjacent to the second electrode group 250 may be a first upper electrode 240u that is formed on the second insulating layer IL2, and a second sub-electrode 250s that is adjacent to the first electrode group 250 may be a second lower electrode 250l that is interposed between the first insulating layer IL1 and the second insulating layer IL2. The width of the first sub-electrode 240s adjacent to the second electrode group 250 may be greater than the width of the other first sub-electrodes 240s of the first electrode group 240. Similarly, the width of the second sub-electrode 240s adjacent to the first electrode group 240 may be greater than the width of the rest of the second sub-electrodes 250s of the second electrode group 250. Referring to FIG. 4, the width of the first sub-electrode 240s adjacent to the second electrode group 250, e.g., a width Wm1, may be substantially the same as the width of the second sub-electrode 240s adjacent to the first electrode group 240, e.g., a width Wm2.

The lens driver 260 may be provided in the first non-display area NDA1. The lens driver 260 may be disposed near the first bus lines 220 and the second bus lines 230. In an exemplary embodiment, the lens driver 260 and the display area DA may be provided on opposite sides of the first bus lines 220 and the second bus lines 230.

The lens driver 260 may be an integrated circuit ("IC"). In response to the display panel 100 being driven in a 2D mode, the lens driver 260 may apply an "off" voltage to the first bus lines 220 and the second bus lines 230 so that the liquid crystal lens device 200 does not operate as a Fresnel lens. On the other hand, in response to the display panel 100 being driven in a 3D mode, the lens driver 260 may apply an "on" voltage to the first bus lines 220 and the second bus lines 230 so that the liquid crystal lens device 200 operates as a Fresnel lens.

The connecting lines 270 may be provided in the first non-display area NDA1. For example, each of the connecting lines 270 may be located between a pair of adjacent first electrode groups 240. In an exemplary embodiment, the connecting lines 270 may be connected to one of the first bus lines 220 that is most adjacent to the display area DA.

The connecting lines 270 may connect the lens driver 260 to one of the first bus lines 220 or one of the second bus lines 230. FIG. 2 illustrates two connecting lines 270, but more than two connecting lines 270 may be provided. For example, in an exemplary embodiment, a plurality of connecting lines 270 electrically connected to the first bus lines 220 and the second bus lines 230, respectively, may be provided. A number of connecting lines 270 corresponding to the number of first bus lines 220 and second bus lines 230 combined or more connecting lines 270 than the number of first bus lines 220 and second bus lines 230 combined may be provided.

In an exemplary embodiment, the connecting lines 270 may be formed of substantially the same material as the first sub-electrodes 240s of each of the first electrode group 240 and the second sub-electrodes 250s of each of the second electrode group 250. For example, the connecting lines 270 may include ITO, IZO or a combination thereof, but the invention is not limited thereto. In an exemplary embodiment, the connecting lines 270 may be formed of substantially the same material as the first bus lines 220 and the second bus lines 230. For example, the connecting lines 270 may include Cu, Al or a combination thereof.

The second substrate 280 may face the first substrate 210. The second substrate 280 may include an insulating substrate. The insulating substrate may be formed of a transparent glass material having $SiO_2$, which is transparent, as an ingredient thereof. In an exemplary embodiment, the insulating substrate may be formed of a plastic material. The insulating substrate may be a flexible substrate that is bendable, foldable, and rollable. The second substrate 280 may be formed of substantially the same material as the first substrate 210.

The common electrode CE may be disposed on one surface of the second substrate 280 that faces the first electrode groups 240 and the second electrode groups 250. The common electrode CE may be formed on the entire surface of the second substrate 280. The common electrode CE may be formed of a transparent conductive oxide material. In an exemplary embodiment, the common electrode CE may include ITO, IZO or a combination thereof, but the invention is not limited thereto. The common electrode CE may be formed of substantially the same material as the first sub-electrodes 240s of each of the first electrode groups 240 and the second sub-electrodes 250s of each of the second electrode groups 250.

The liquid crystal layer LC may be interposed between the first substrate 210 and the second substrate 280. For example, the liquid crystal layer LC may be disposed above the first electrode groups 240 and the second electrode groups 250, and below the common electrode CE. The liquid crystal layer LC may include a plurality of liquid crystal molecules, and may change the path of light incident thereupon according to an electric field applied thereto.

In the liquid crystal lens device 200, the first electrode groups 240, which account for part of each unit lens LU, are connected to the first bus lines 220 in the part of the first non-display area NDA1 at the top of the display area DA. The second electrode groups 250, which account for the rest of each unit lens LU, are connected to the second bus lines 230 in the part of the second non-display area NDA2 at the bottom of the display area DA. Accordingly, sufficiently large contact areas may be provided for the first electrode groups 240 and the first bus lines 220 and for the second electrode groups 250 and the second bus lines 230.

The providing of contact areas will hereinafter be described in detail with reference to FIG. 4. FIG. 4 is an enlarged plan view of portion IV of FIG. 2.

Referring to FIG. 4, a plurality of contact portions CP may be provided at the ends of a plurality of first sub-electrodes 240s, respectively. A contact portion CP may also be provided at the end of a connecting line 270. Each of the contact portions CP may include at least one contact hole CH. In an exemplary embodiment, each of the contact portions CP may include two contact holes CH, as illustrated in FIG. 4, but the invention is not limited thereto. For example, each of the contact portions CP may include only one contact hole CH.

first sub-electrodes 240s may be electrically connected to a plurality of first bus lines 220, respectively, through their respective contact portions CP. The connecting line 270 may be electrically connected to each of the first bus lines 220 through its contact portion CP.

The contact portions CP may be larger than a predetermined size. In an exemplary embodiment, the contact portions CP may have a horizontal length Cx and a vertical length Cy. The horizontal length Cx may be about 3 times to about 20 times the width of the first sub-electrodes 240s, and the vertical length Cy may be about 2 times to about 4 times the width of the first bus lines 220.

In the case of a small-size display device, a sufficiently large region may be provided for forming the contact portions CP thereon. The region for forming the contact portions CP may be larger than the predetermined size. In the liquid crystal lens device 200, the first electrode groups 240, which account for part of each unit lens LU, are connected to the first bus lines 220 in the part of the first non-display area NDA1 at the top of the display area DA, and the second electrode groups 250, which account for the rest of each unit lens LU, are connected to the second bus lines 230 in the part of the second non-display area NDA2 at the bottom of the display area DA. Accordingly, sufficiently large contact areas may be provided for the first electrode groups 240 and the first bus lines 220 and for the second electrode groups 250 and the second bus lines 230. For example, since no contacts for the second electrode groups 250 and the second bus lines 230 are provided in the part of the first non-display area NDA1 at the top of the display area DA, sufficiently large contact areas may be provided in the first non-display area NDA1 for the first electrode groups 240 and the first bus lines 220. Similarly, since no contacts for the first electrode groups 240 and the first bus lines 220 are provided in the part of the second non-display area NDA2 at the bottom of the display area DA, sufficiently large contact areas may be provided in the second non-display area NDA2 for the second electrode groups 250 and the second bus lines 230.

Referring to FIG. 4, the liquid crystal lens device 200 may satisfy Equation (1):

$$\frac{1}{2}Lp \geq (Cx+S0)\times 2 - \left(Wm1+\frac{S2}{2}\right) \quad (1)$$

where Lp denotes the period of the unit lens LU, Wm1 denotes the width of the first sub-electrode 240s adjacent to the second electrode group 250, Wm2 denotes the width of the second sub-electrode 250s adjacent to the first electrode group 240, S0 denotes a minimum allowable distance between two contact portions CP, S1 denotes a minimum allowable distance between the first sub-electrode 240s adjacent to the second electrode group 250 and the second sub-electrode 250s adjacent to the first electrode group 240, and S2 denotes a minimum allowable distance between the connecting line 270 and a subsequent unit lens LU, and where the widths Wm1 and Wm2 may be identical and the distances S0, S1, and S2 may be identical.

As indicated by Equation (1) above, the contact portions CP and the connecting line 270 may be arranged in consideration of half the period LP of the unit lens LU.

Figure 5:
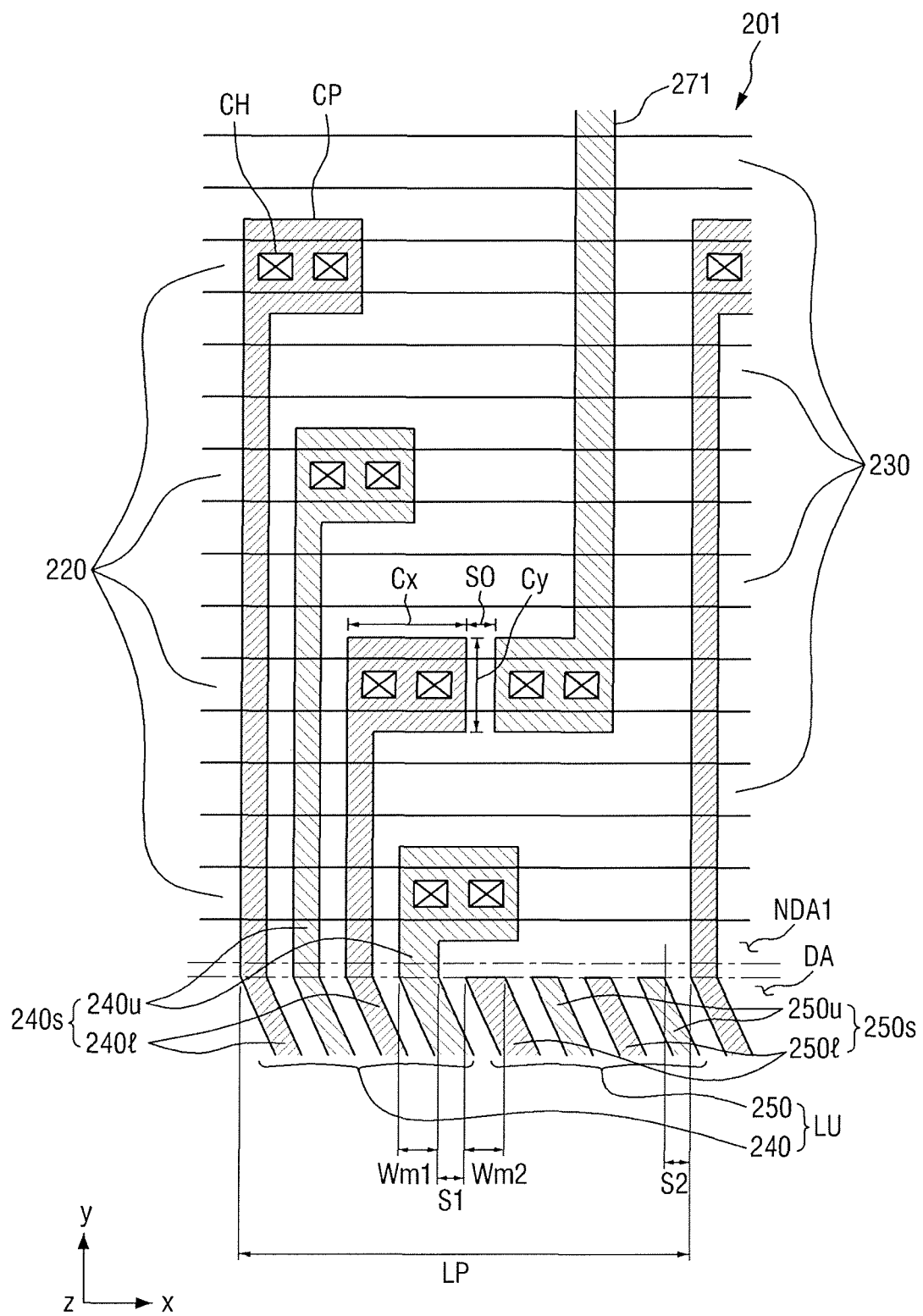
FIG. 5 is an enlarged plan view of a portion of a liquid crystal lens device according to an exemplary embodiment of the invention corresponding to portion IV of FIG. 2.

FIG. 5 is an enlarged plan view of a portion of a liquid crystal lens device 201 according to an exemplary embodiment of the invention, corresponding to portion IV of FIG. 2. In FIGS. 1 to 5, like reference numerals may indicate like elements, and thus, detailed descriptions thereof may be omitted for convenience.

Referring to FIG. 5, a connecting line 271 may be connected to one of a plurality of first bus lines 220 that is not closest to a display area DA. Even though not specifically illustrated in FIG. 5, a plurality of connecting lines 271 may be provided among a plurality of first electrode groups 240 in a first non-display area NDA1.

Figure 6:
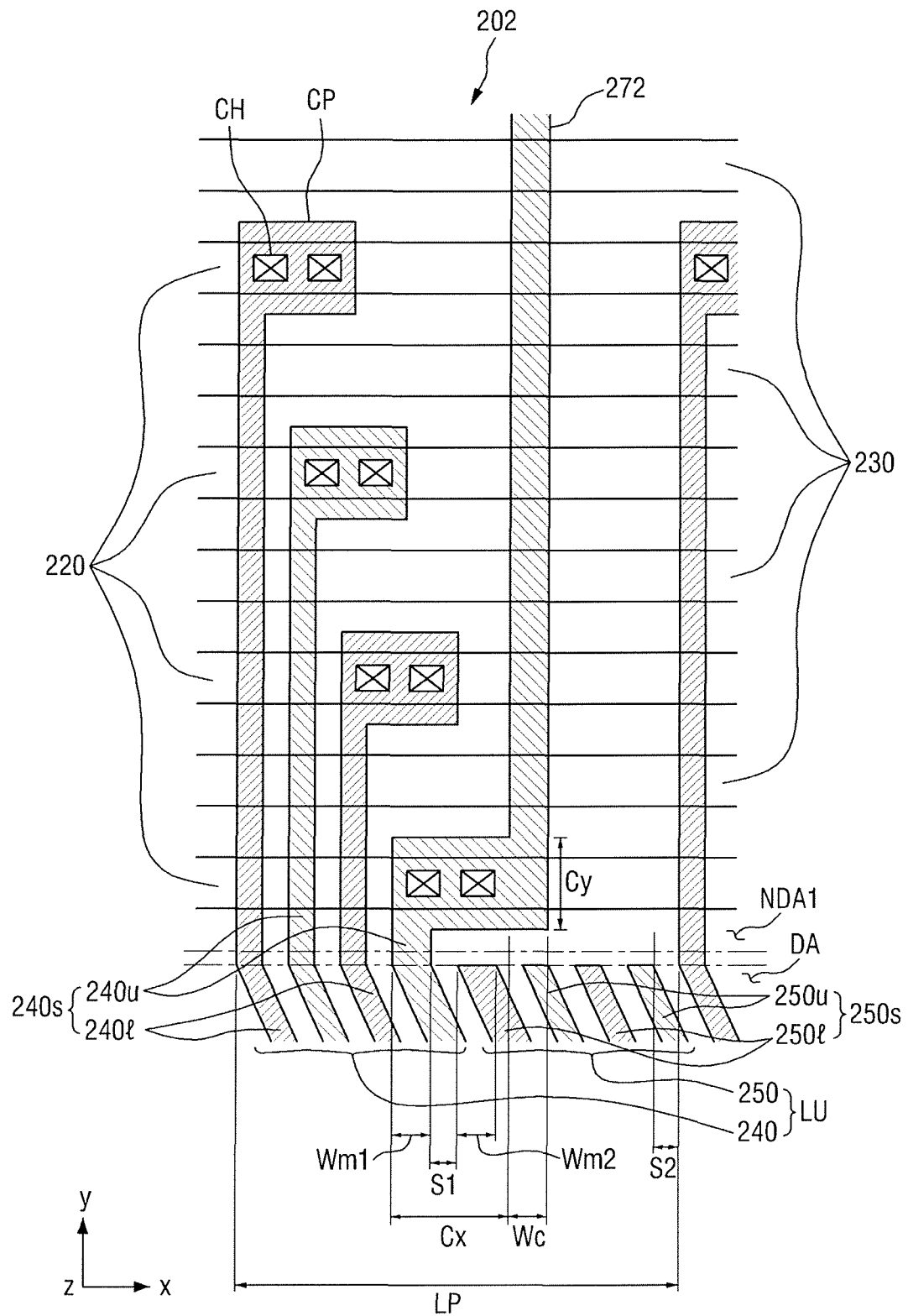
FIG. 6 is an enlarged plan view of a portion of a liquid crystal lens device according to an exemplary embodiment of the invention corresponding to portion IV of FIG. 2.

FIG. 6 is an enlarged plan view of a portion of a liquid crystal lens device 202 according to an exemplary embodiment of the invention, corresponding to portion IV of FIG. 2. In FIGS. 1 to 6, like reference numerals may indicate like elements, and thus, detailed descriptions thereof may be omitted for convenience.

Referring to FIG. 6, a connecting line 272 may be formed in one body with one of a plurality of first sub-electrodes 240s. The width of the connecting line 272, e.g., a width Wc, may be the same as the width of one of the first sub-electrodes 240s that is adjacent to a second electrode group 250, e.g., a width Wm1. The liquid crystal lens device 202 may satisfy Equation (2):

$$\frac{1}{2}Lp > (Cx+Wc) - \left(Wm1+\frac{S1}{2}\right). \quad (2)$$

As indicated by Equation (2) above, a plurality of contact portions CP and the connecting line 272 may be arranged in consideration of half a period LP of a unit lens LU.

Figure 7:
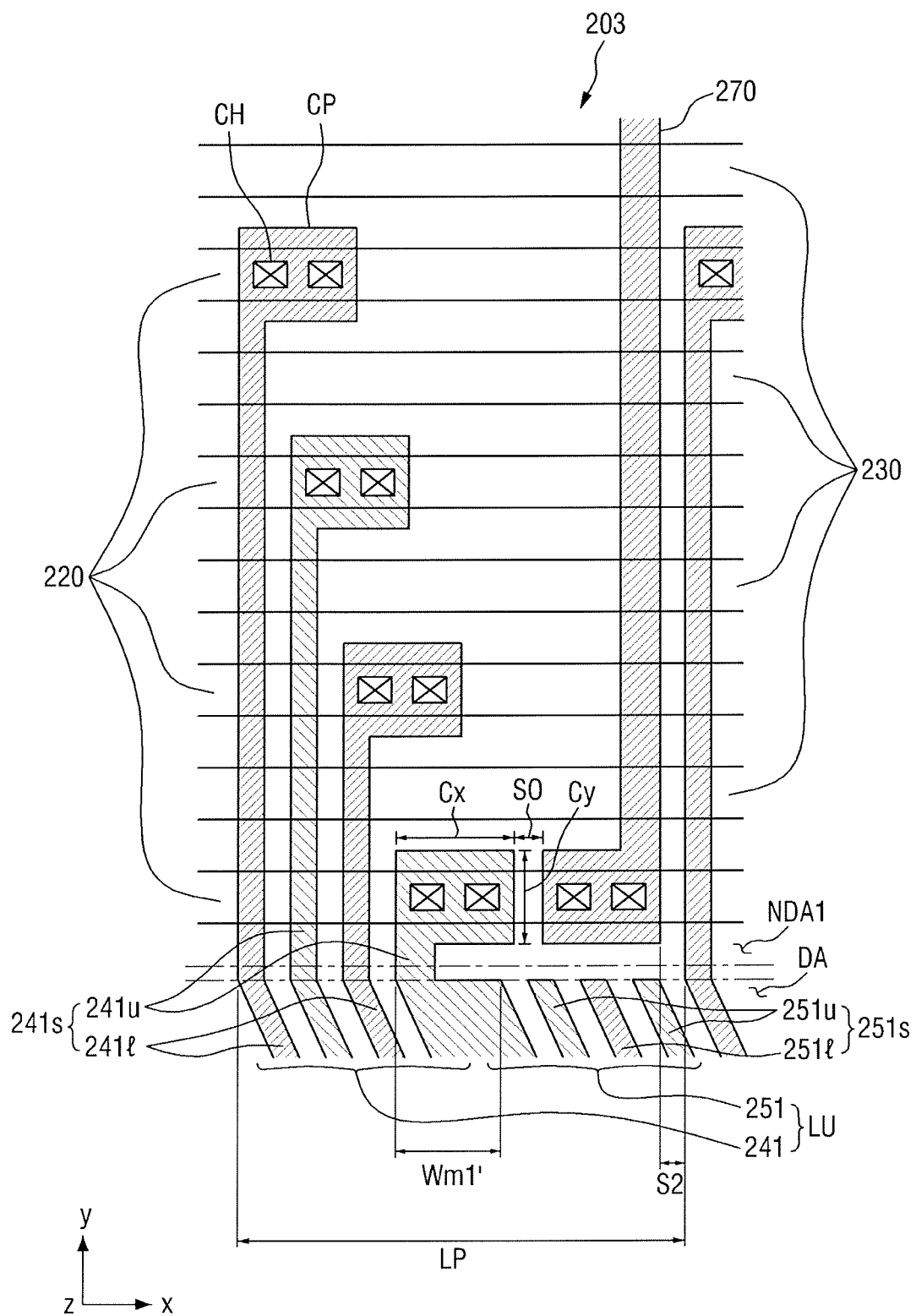
FIG. 7 is an enlarged plan view of a portion of a liquid crystal lens device according to an exemplary embodiment of the invention corresponding to portion IV of FIG. 2.

FIG. 7 is an enlarged plan view of a portion of a liquid crystal lens device 203 according to an exemplary embodiment of the invention, corresponding to portion IV of FIG. 2. In FIGS. 1 to 7, like reference numerals may indicate like elements, and thus, detailed descriptions thereof may be omitted for convenience.

Referring to FIG. 7, in a unit lens LU, a width Wm1' of one of a plurality of first sub-electrodes 241s that is adjacent to a second electrode group 251 may be different from a width of one of a plurality of second sub-electrodes 251s that is adjacent to a first electrode group 241. The width Wm1' may be the same as the sum of the width Wm1, the distanced S1 and the width Wm2 of FIG. 4.

The number of first sub-electrodes 241s may be greater than the number of second sub-electrodes 251s. In an exemplary embodiment, the number of first sub-electrodes 241s may be one greater than the number of second sub-electrodes 251s, as illustrated in FIG. 7. For example, the first sub-electrodes 241s may include two first lower electrodes 241l and two first upper electrodes 241u, and the second sub-electrodes 251s may include one second lower electrode 251l and two second upper electrodes 251u.

The first sub-electrode 241s adjacent to the second electrode group 251 may be disposed on a level with the second sub-electrode 251s adjacent to the first electrode group 241. More specifically, the first sub-electrode 241s adjacent to the second electrode group 251 may be a first upper electrode 241u formed on a second insulating layer IL2, and the second sub-electrode 251s adjacent to the first electrode group 241 may be a second upper electrode 251u formed on the second insulating layer IL2.

Figure 8:
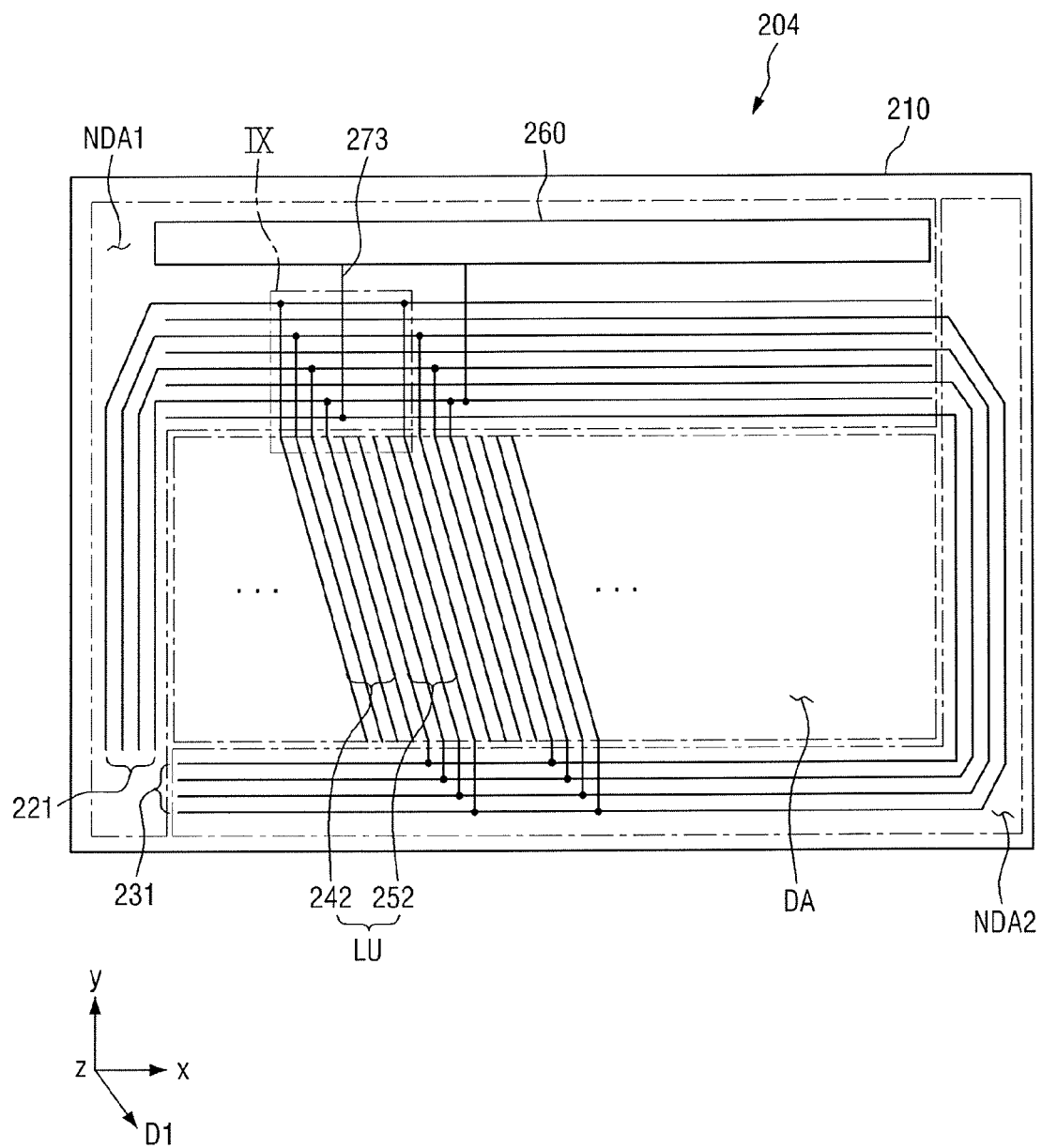
FIG. 8 is a plan view of a liquid crystal lens device according to an exemplary embodiment of the invention.
Figure 9:
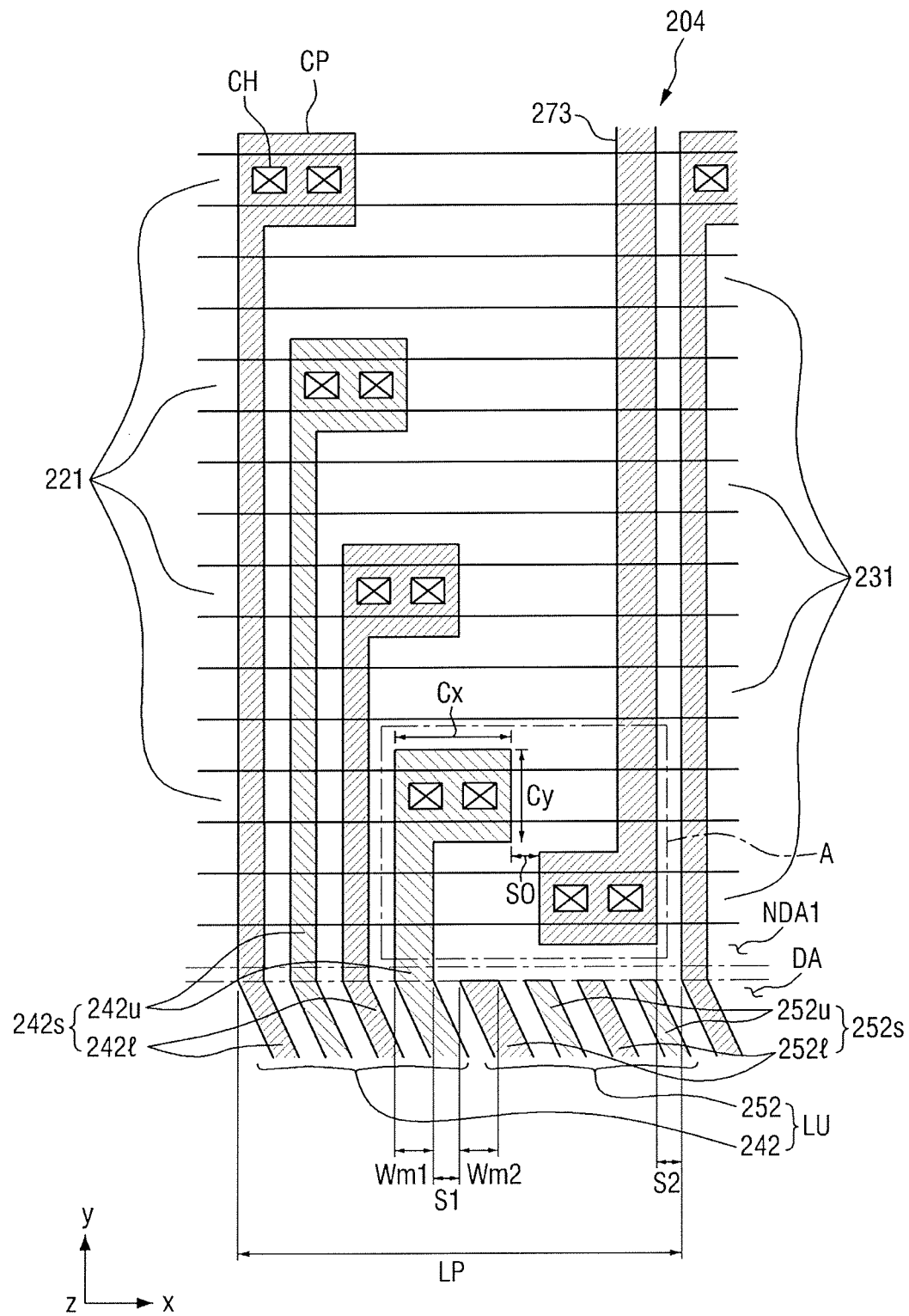
FIG. 9 is an enlarged plan view of portion IX of FIG. 8.

FIG. 8 is a plan view of a liquid crystal lens device 204 according to an exemplary embodiment of the invention, and FIG. 9 is an enlarged plan view of portion IX of FIG. 8. In FIGS. 1 to 9, like reference numerals may indicate like elements, and thus, detailed descriptions thereof may be omitted for convenience.

Referring to FIG. 8, a plurality of first bus lines 221 and a plurality of second bus lines 231 may be alternately arranged, starting with a second bus line 231 directly at the top of a display area DA. For example, the exemplary embodiment of FIG. 8 differs from the exemplary embodiment of FIG. 2 in terms of the order in which the first bus lines 221 and the second bus lines 231 are arranged over a first non-display area NDA1. Accordingly, a plurality of first electrode groups 242 and a plurality of second electrode groups 252 may have different shapes from the first electrode groups 240 and the second electrode groups 250, respectively, of FIG. 2. Connecting lines 273 may be connected to one of the second bus lines 231 most adjacent to the display area DA.

Referring to FIG. 9, a plurality of second sub-electrodes 252s including second lower electrodes 252l and second upper electrodes 252u may be the same as their counterparts of FIG. 2, e.g., the second sub-electrodes 250s including the second lower electrodes 250l and the upper electrodes 252u, but a plurality of first sub-electrodes 242s including first lower electrodes 242l and first upper electrodes 242u may differ from their counterparts of FIG. 2, e.g., the first sub-electrodes 240s. For example, the first sub-electrodes 242s may extend longer than the first sub-electrodes 240s in the first non-display area NDA1.

In portion A of FIG. 9, a contact portion CP of a first sub-electrode 242s need not be aligned side-by-side with a contact portion CP of a connecting line 273.

Figure 10:
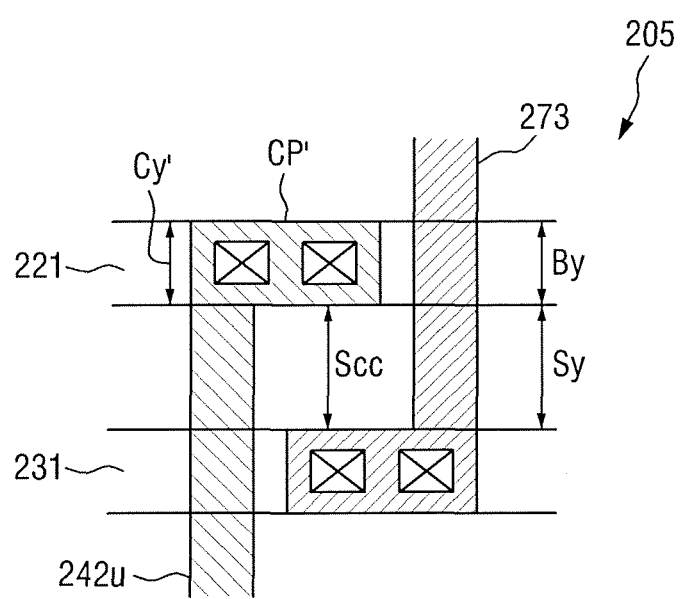
FIG. 10 is an enlarged plan view of a portion of a liquid crystal lens device according to an exemplary embodiment of the invention corresponding to portion A of FIG. 9.
Figure 11:
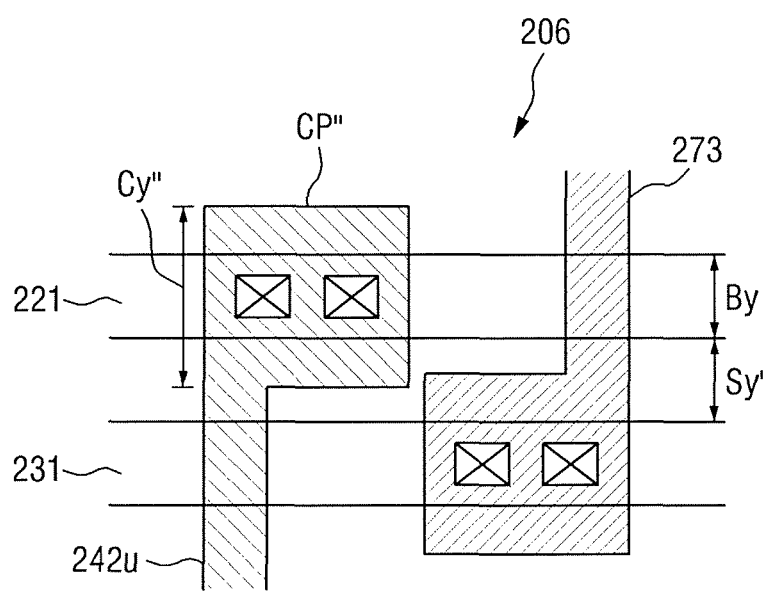
FIG. 11 is an enlarged plan view of a portion of a liquid crystal lens device according to an exemplary embodiment of the invention corresponding to portion A of FIG. 9.

Liquid crystal lens devices according to exemplary embodiments of the invention that differ from the liquid crystal lens device 204 in portion A of FIG. 9 will hereinafter be described with reference to FIGS. 10 and 11. FIG. 10 is an enlarged plan view of a portion of a liquid crystal lens device 205 according to an exemplary embodiment of the invention, corresponding to portion A of FIG. 9, and FIG. 11 is an enlarged plan view of a portion of a liquid crystal lens device 206 according to an exemplary embodiment of the invention, corresponding to portion A of FIG. 9.

Referring to FIG. 10, the liquid crystal lens device 205 may satisfy Equation (3):

$$Cy'+Scc \leq By+Sy \qquad (3)$$

where Cy' denotes a vertical length of each contact portion CP', Scc denotes the distance between two contact portions CP', By denotes the width of a first bus line 221 or a second bus line 231, and Sy denotes the distance between the first bus line 221 and the second bus line 231.

Referring to FIG. 11, the liquid crystal lens device 206 may satisfy Equation (4):

$$Cy''+Scc \leq By+Sy' \qquad (4)$$

where Cy" denotes a vertical length of each contact portion CP" and Sy' denotes the distance between a first bus line 221 and a second bus line 231, and where the vertical length Cy" and the distance Sy' may be less than the vertical length Cy' and the distance Sy, respectively, of FIG. 10.

While the invention has been particularly shown and described with reference to exemplary embodiments thereof, it will be understood by those of ordinary skill in the art that various changes in provide and detail may be made therein without departing from the spirit and scope of the invention. The exemplary embodiments should be considered descriptive only and not limiting.

What is claimed is:

1. A liquid crystal lens device, comprising:
   a first substrate including a display area, a first non-display area, and a second non-display area, the display area interposed between the first and second non-display areas;
   a plurality of first bus lines disposed over the first non-display area;
   a plurality of second bus lines disposed over the second non-display area and insulated from the first bus lines;
   a plurality of first electrode groups disposed over the display area and the first non-display area and connected to the plurality of first bus lines; and
   a plurality of second electrode groups disposed over the display area and the second non-display area and connected to the plurality of second bus lines.

2. The liquid crystal lens device of claim 1, wherein the plurality of first electrode groups do not cover the second non-display area and the plurality of second electrode groups do not cover the first non-display area.

3. The liquid crystal lens device of claim 1, wherein the plurality of second bus lines extends throughout the second non-display area and meet the first non-display area.

4. The liquid crystal lens device of claim 3, wherein one of the plurality of first bus lines is located between a pair of adjacent second bus lines of the plurality of second bus lines in the first non-display area.

5. The liquid crystal lens device of claim 3, further comprising:
   a lens driver disposed in the first non-display area and proximate to the plurality of first bus lines and the plurality of second bus lines.

6. The liquid crystal lens device of claim 5, wherein the plurality of first bus lines and the plurality of second bus lines are disposed between the lens driver and the display area.

7. The liquid crystal lens device of claim 5, further comprising:
   connecting lines connecting the lens driver to one of the plurality of first bus to lines or one of the plurality of second bus lines,
   wherein each of the connecting lines is located between a pair of adjacent first electrode groups of the plurality of first electrode groups in the first non-display area.

8. The liquid crystal lens device of claim 7, wherein each of the plurality of first electrode groups includes a plurality of first sub-electrodes and each of the connecting lines is formed contiguously with one of the first sub-electrodes of the plurality of first sub-electrodes of each of the plurality of first electrode groups.

9. The liquid crystal lens device of claim 1, wherein one of the plurality of first electrode groups is located between a pair of adjacent second electrode groups of the plurality of second electrode groups.

10. The liquid crystal lens device of claim 1, wherein the plurality of first electrode groups and the plurality of second electrode groups extend diagonally with respect to sides of the first substrate.

11. The liquid crystal lens device of claim 1, wherein each of the plurality of first electrode groups includes a plurality of first sub-electrodes, each of the plurality of first sub-electrodes including two or more first lower electrodes and two or more first upper electrodes disposed above the two or more first lower electrodes and insulated from the two or more first lower electrodes, and each of the plurality of second electrode groups includes a plurality of second sub-electrodes, each of the plurality of second sub-electrodes including two or more second lower electrodes and two or more second upper electrodes disposed above the two or more second lower electrodes and insulated from the two or more second lower electrodes.

12. The liquid crystal lens device of claim 11, wherein one of the plurality of first sub-electrodes is located between a pair of adjacent first upper electrodes of the two or more first upper electrodes and one of the plurality of second sub-electrodes is located is between a pair of adjacent second upper electrodes of the two or more second upper electrodes.

13. The liquid crystal lens device of claim 11, wherein a first electrode group of the plurality of first electrode groups and a second electrode group of the plurality of second electrode groups, adjacent to the first electrode group, form a unit lens and in the unit lens, one of a plurality of first sub-electrodes of the first electrode group that is adjacent to the second electrode group is disposed on a different level from one of a plurality of second sub-electrodes of the second electrode group that is adjacent to the first electrode group.

14. The liquid crystal lens device of claim 11, wherein a first electrode group of the plurality of first electrode groups and a second electrode group of the plurality of second electrode groups, adjacent to the first electrode group, form a unit lens and in the unit lens, one of a plurality of first sub-electrodes of the first electrode group that is adjacent to the second electrode group has substantially the same width as one of a plurality of second sub-electrodes of the second electrode group that is adjacent to the first electrode group.

15. The liquid crystal lens device of claim 11, wherein a first electrode group of the plurality of first electrode groups and a second electrode group of the plurality of second electrode groups, adjacent to the first electrode group, form a unit lens and in the unit lens, one of a plurality of first sub-electrodes of the first electrode group that is adjacent to the second electrode group has a different width from one of a plurality of second sub-electrodes of the second electrode group that is adjacent to the first electrode group.

16. The liquid crystal lens device of claim 1, further comprising:
   a second substrate facing the first substrate; and
   a liquid crystal layer interposed between the first substrate and the second substrate.

17. A liquid crystal lens device, comprising:
   a substrate including a display area and a first non-display area disposed on a first side of the display area;
   a plurality of first bus lines and a plurality of second bus lines disposed over the first non-display area, the plurality of second bus lines being insulated from the plurality of first bus lines; and
   a plurality of first electrode groups disposed over the display area and the first non-display area and connected to the plurality of first bus lines,
   wherein the plurality of first bus lines and the plurality of second bus lines are interlaced over the first non-display area.

18. The liquid crystal lens device of claim 17, wherein the substrate further includes a second non-display area disposed on a second side of the display area, the second side of the display area being opposite to the first side of the display area, and the plurality of second bus lines extend throughout the first non-display area and meet the second non-display area.

19. The liquid crystal lens device of claim 18, further comprising:
   a plurality of second electrode groups disposed over the display area and the second non-display area and connected to the plurality of second bus lines.

20. The liquid crystal lens device of claim 19, wherein the plurality of first electrode groups and the plurality of second electrode groups are interlaced.

21. A display device, comprising:
   a display panel configured to display a two-dimensional ("2D") image in a 2D mode and display a three-dimensional ("3D") image in a 3D mode; and
   a liquid crystal lens device disposed over the display panel,
   wherein the liquid crystal lens device comprises:
      a first substrate including a display area, a first non-display area, and a second non-display area facing the first non-display area with the display area interposed therebetween;
      a plurality of first bus lines disposed over the first non-display area but not over the second non-display area;
      a plurality of second bus lines disposed over the second non-display area but not over the first non-display area and insulated from the first bus lines;
      a plurality of first electrode groups disposed over the display area and the first non-display area but not the second non-display area and connected to the plurality of first bus lines; and
      a plurality of second electrode groups disposed over the display area and the second non-display area but not the first non-display area and connected to the plurality of second bus lines.

* * * * *